(12) United States Patent
    Forin et al.

(10) Patent No.: US 6,668,291 B1
(45) Date of Patent: Dec. 23, 2003

(54) NON-BLOCKING CONCURRENT QUEUES WITH DIRECT NODE ACCESS BY THREADS

(75) Inventors: Alessandro Forin, Redmond, WA (US); Andrew Raffman, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/392,405

(22) Filed: Sep. 9, 1999

Related U.S. Application Data

(60) Provisional application No. 60/099,562, filed on Sep. 9, 1998.

(51) Int. Cl.[7] ............................................. G06F 13/10
(52) U.S. Cl. .......................... 710/54; 710/55; 712/228
(58) Field of Search ...................... 710/54, 55; 712/228

(56) References Cited

U.S. PATENT DOCUMENTS 6,065,019 A  *  5/2000  Ault et al. .................. 707/206
6,178,473 B1  *  1/2001  Bonola ........................ 710/54

OTHER PUBLICATIONS

B. Bershad, et al., "Extensibility, Safety and Performance in the Spin Operating System," *15th ACM Symposium on Operating System Principles, Copper Mountain Resort*, Colorado, Dec. 1995, pp. 267–284.

D. Black, et al., "Microkernel Operating System Architecture and Mach," *1st USENIX Workshop on Micro–Kernels and Other Kernel Architectures*, Seattle, Apr. 1992, pp. 11–30.

D. Cheriton, et al., "A Caching Model of Operating System Kernel Functionality," *Proceedings of the First Symposium on Operating Systems Design and Implementation*, Seattle, 1994, 15 pages.

D. Cheriton, "The V Distributed System", *Communications of the ACM*, Mar. 1998, vol. 31, No. 3, pp. 314–333.

R. Draves, et al., "Unifying the User and Kernel Environments," *Microsoft Research Technical Report MSR–TR–97–10*, Mar. 1997, 16 pages.

D. Engler, et al., "Exokernel: An Operating System Architecture for Application–Level Resource Management," *15th ACM Symposium on Operating System Principles, ACM SIGOPS*, Copper Mountain Resort, Colorado, Dec. 1995, pp. 251–266,.

B. Ford, et al., "The Flux OSkit: A Substrate for Kernel and Language Research," *Proceedings of the 16th ACM Symposium on Operating Systems Principles, ACM SIGOPS*, Saint–Malo, France, Oct. 1997, pp. 38–51.

D. Golub, et al., "UNIX as an application program," *USENIX 1990 Summer Conference*, Anaheim, CA, Jun. 1990, pp. 87–95.

J. Helander, "Unix Under Mach: The Lites Server," *Master's Thesis*, Helsinki University of Technology, 1994, 71 pages.

(List continued on next page.)

*Primary Examiner*—Jeffrey Gaffin
*Assistant Examiner*—Tammara Peyton
(74) *Attorney, Agent, or Firm*—Leydig, Voit & Mayer, Ltd.

(57) ABSTRACT

Multiple non-blocking FIFO queues are concurrently maintained using atomic compare-and-swap (CAS) operations. In accordance with the invention, each queue provides direct access to the nodes stored therein to an application or thread, so that each thread may enqueue and dequeue nodes that it may choose. The prior art merely provided access to the values stored in the node. In order to avoid anomalies, the queue is never allowed to become empty by requiring the presence of at least a dummy node in the queue. The ABA problem is solved by requiring that the next pointer of the tail node in each queue point to a "magic number" unique to the particular queue, such as the pointer to the queue head or the address of the queue head, for example. This obviates any need to maintain a separate count for each node.

41 Claims, 7 Drawing Sheets

OTHER PUBLICATIONS

D. Hildebrand, "An Architectural Overview of QNX," *1st USENIX Workshop on Micro–kernels and Other Kernel Architectures*, Seattle, Apr. 1992, pp. 113–126.

M. Jones, et al., "An Overview of the Rialto Real–Time Architecture," *Proceedings of the Seventh ACM SIGOPS European Workshop*, SIGOPS, Sep. 1996, pp. 249–256.

M. Jones, et al., "CPU Reservations and Time Constraints: Efficient, Predictable Scheduling of Independent Activities," *Proceedings of the 16th ACM Symposium on Operating System Principles, ACM SIGOPS, Saint–Malo, France*, Oct. 1997, pp. 198–211.

M. Jones, The Microsoft Interactive TV System: An Experience Report, Microsoft Research Technical Report MSR–TR–97–18 [online], Jul. 1997, 24 pages. Retrieved Jan. 26, 2000 from the Internet at http://www.research.microsoft.com/research/os/mbj/papers/mitv/tr–97–18.html.

D. Julin, et al., "Generalized Emulation Services for Mach 3.0 Overview, Experiences and Current Status," *Proceedings of the Usenix Mach Symposium USENIX Association*, 1991, pp. 13–26.

D. Lee, et al., "Execution Characteristics of Desktop Applications on Windows NT," *Proceedings of the 25$^{th}$ International Symposium on Computer Architecture, IEEE*, Barcelona, Spain, Jun. 1998, pp. 27–38.

J. Liedtke, "On μ–Kernel Construction," *15th ACM Symposium on Operating System Principles, ACM, Copper Mountain Resort*, Colorado, Dec. 1995, pp. 237–250.

J. Mogul, et al., "The Packet Filter: An Efficient Mechanism for User–level Network Code," *11th ACM Symposium on Operating System Principles*, ACM, Nov. 1987, 34 pages.

R. Rashid, "From RIG to Accent to Mach: The Evolution of a Network Operating System," *Carnegie–Mellon University Technical Report*, Aug. 1987, pp. 1128–1137.

M. Rozier, et al., "CHORUS Distributed Operating System," Computing Systems, Fall 1998, vol. 1, No. 4, pp. 305–370.

Torborg, Jay, et al., "Talisman: Commodity Realtime 3D Graphics for the PC," *Proceeding of SIGGRAPH 96, ACM*, Aug. 1996, pp. 353–363.

M. Young, "Exporting a User Interface to Memory Management from a Communication–Oriented Operating System," *Ph. D. Thesis CMU–CS–89–202, Carnegie–Mellon University*, Nov. 1989, 206 pages.

* cited by examiner

NON-BLOCKING CONCURRENT QUEUES WITH DIRECT NODE ACCESS BY THREADS

CROSS-REFERENCE TO RELATED APPLICATION

This application is a utility application filing of provisional patent serial No. 60/099,562, filed on Sep. 9, 1998 and entitled "A Highly Componentized System Architecture With Dynamically Loadable Operating Features" (now abandoned).

BACKGROUND OF THE INVENTION

1. Technical Field

The invention is related to first-in-first-out (FIFO) queues employing non-blocking atomic compare-and-swap (CAS) instructions.

2. Background Art

A FIFO queue may be used by various application or process threads which may wish to enqueue or dequeue certain data on the queue. Typically, a queue is a list of different memory locations containing particular data, and each memory location is typically referred to as a "node" of the queue. The nodes are kept in order by providing in each node a "next" pointer that points to the memory location of the next node in the queue. The head of the queue is the first node ("head node") while the last node is the tail node. The tail node's next pointer points to a predetermined number, such as NULL. A node is enqueued by inserting it at the tail so that it becomes the new tail node of the queue. This requires the thread to first determine which node is the current tail node. Nodes are dequeued at the head, so that the head node is dequeued and the next node becomes the head node. This requires the thread to first determine which node is the current head node. The queue has a head pointer pointing to the head node and a tail pointer pointing to the tail node.

Maintaining the integrity of the queue while permitting its concurrent use by a number of different threads is a difficult problem. To solve this problem, the queue design must address all possible pathological conditions that the queue could experience. For example, after one thread has identified the tail node in preparation for an enqueue operation, another thread may interrupt and enqueue another node onto the queue (which obsoletes the one node's prior identification of the tail node). As another example: the head and tail nodes may be one and the same node because it is the only node on the queue; and one thread may identify the tail node in preparation for enqueueing a new node onto the queue; but, before it can, another thread may dequeue and move the tail node to another queue (for example) without changing its next pointer from NULL. In this case, the one thread may still succeed in attaching the new node to what it still believes is the tail node of the desired queue, but would actually be enqueueing the new node on the wrong queue. This latter case is typically referred to as the "ABA problem" and is described extensively in the literature. It is plausible that such an event could occur even if there were more than one node on the queue in the following example: after the one thread identifies the tail node, actions by other threads cause the tail node to be moved to the head and then dequeued and re-enqueued on another queue before the one thread completes its enqueueing operation. In any case, the ABA problem entails the risk of a thread unknowingly enqueueing a new node on the wrong queue or other location.

Initially, the ABA problem was solved by providing, whenever one thread was in the middle of an enqueue or dequeue operation, a lock which protected the queue from being changed by another contending thread. However, such blocking queues are susceptible to large unpredictable delays in process execution, since a single thread can monopolize the queue, particularly if it is a low priority thread that is interrupted by other higher priority threads.

As a result, the art has sought a non-blocking queue (i.e., a queue with no locks) permitting concurrent access to the queue by more than one thread without suffering failures due to the ABA problem. In such a concurrent non-blocking queue, the ABA problem has been solved in ways that burden the queue and impair performance. One such concurrent non-blocking queue is described by Michael et al., "Simple, Fast, and Practical Non-Blocking and Blocking Concurrent Queue Algorithms," PODC, 1996. This publication describes a concurrent non-blocking queue in which the ABA problem is addressed by assigning an extra "count" field to the queue pointers such as the next pointer of the tail node. Thus, for example, each time the tail node is modified by any thread, the count associated with the next pointer of the tail node would be incremented. In the ABA situation, if the tail node has been dequeued and re-enqueued on another node, a thread trying to enqueue a new node onto the first queue would recognize that the next pointer "count" field of the what it believes to be tail node has changed, even if the next pointer still has the same value as before. Therefore the thread would not complete its enqueue operation, thereby preventing an ABA problem.

Another difficulty in the implementation of a non-blocking queue is the method of handling the case where the queue is empty; in other words, when there are no nodes in the queue. Support for enqueueing a node on an empty queue, or dequeueing the last node on a queue (leaving it empty) can greatly complicate the implementation, as each enqueue and dequeue operation would then need to maintain both the head and tail pointers. To simplify this case, the queue in the Michael publication keeps at least one node in the queue at all times. To implement this, the queue in the Michael publication must control the nodes, rather than letting threads enqueue or dequeue their own nodes. In the Michael publication, each node is selected from a list maintained for the queue. The data of interest is then stored in the node. Such data is taken from a thread and copied into the node for an "enqueue" operation. It is later copied out of the node and returned to a thread for a "dequeue" operation while the node itself is not, the node always being preserved for use with the queue. If the dequeue operation determines that the node being dequeued is the last node in the queue, it is left there to ensure that there is always at least one node in the queue.

The requirement that the queue allocate and deallocate the individual nodes constricts queue performance and constricts the manner in which threads may use the queue. This is especially true with regard to situations where the enqueue or dequeue operations may take place in an execution context from which memory allocation operations cannot be invoked (such as within an interrupt handler).

It is therefore desired to provide a concurrent non-blocking queue in which it is not necessary to maintain extra count fields and in which the threads themselves enqueue and dequeue any nodes they wish on the queue without any risk of emptying the queue.

SUMMARY OF THE DISCLOSURE

The design described here differs from the Michael publication in two fundamental ways:

a) The use of a "magic number" (other than NULL) to be placed into the next pointer of the last node in the list, thus avoiding the use of a count and circumventing the ABA problem b) The use of a dummy node to ensure that the queue is never empty, while still allowing the enqueue and dequeue of nodes managed outside of the control of the queue itself.

An application or thread enqueues a new node into the queue by, first, setting the next pointer of the new node to the magic number. If the next pointer of the current tail node points to the magic number, then its next pointer is changed to point to the new node. If this operation is successful, then the queue's tail pointer is changed to point to the new node. If the foregoing conditions were not satisfied, then the tail pointer has been moved by another application or thread during the interim. This is corrected by changing the tail pointer to the next pointer of the node currently pointed to by the tail pointer. Then, the enqueue process is attempted again, and this cycle is repeated until successful.

An application or thread dequeues a node from the queue by, first, making local copies of the current version of the queue's head pointer, tail pointer and the next pointer of the head node (the node pointed to by the head pointer). A check is then made to ensure that the queue's head pointer has not changed, and then a check is made to ensure that the head and tail pointers do not point to the same thing. If they do, this indicates that either (a) the queue is empty or (b) another thread has changed the queue so that the tail pointer needs correcting. These two possibilities are resolved by checking whether the next pointer of the head node points to the magic number (in which case the queue is empty). If the queue is not empty, the tail pointer is corrected by changing it to point to the node pointed to by the next pointer of the node currently pointed to by the tail pointer. The foregoing dequeue process is then repeated until the above conditions are met. Once the above conditions are met (i.e., the head and tail pointers do not point to the same node), the current head node is dequeued by changing the head pointer to point to the node currently pointed to by the next pointer of the node being dequeued. Next, the dequeued node is checked to ensure that it is not the dummy node. If it is, then the dummy node is re-enqueued and the next node is dequeued as the one actually desired by the application.

In accordance with one aspect of the invention, a method is provided for one thread in a system running plural threads to enqueue a new node of its own choosing onto a selected FIFO queue, the system having plural FIFO queues, each queue including a succession of enqueued nodes and having a head pointer pointing to a head node and a tail pointer pointing to a tail node, each of the nodes having a next pointer, the next pointers of the enqueued nodes pointing to the next node in the succession from the head node to the tail node. The enqueueing method is carried out by first obtaining from the selected queue a queue-specific number of the selected queue unique to the selected queue. In this embodiment, this queue-specific number is used as the "magic number". The next step is setting the next pointer of the new node to the queue-specific number. A determination is next made as to whether another one of the threads has preempted the one thread and, if so, updating the tail if needed and then re-starting the method. Otherwise, the next step is setting the next pointer of the tail node to point to the new node. The final step is setting the tail pointer to point to the new node if it has not been updated by another thread during the execution of the enqueueing method.

The step of determining whether another one of the threads has preempted the one thread includes making a local copy of the tail pointer of the selected queue and then determining whether the next pointer of the tail node of the selected queue no longer points to the queue-specific number of the selected queue. If the next pointer no longer points to the queue-specific number, a determination is made as to whether the tail pointer of the selected queue has changed since the local copy of the tail pointer was made.

The step of updating the tail pointer is needed if the tail pointer has not changed since the local copy was made, and is performed by changing the tail pointer to be equal to the next pointer of the tail node of the selected queue.

The step of setting the tail pointer to the new node if it has not been updated by another thread is carried out by first determining whether the tail pointer of the selected queue has not change since the making of the local copy. If the tail pointer has not changed since the making of the local copy, the tail pointer is changed by setting the tail pointer to point to the new node.

In the general case, the next pointer of the tail node of the queue initially points to the queue-specific number. The queue-specific number may be the address of the head pointer of the queue or the address of the tail pointer of the queue or a pointer having its low bit set to one or a system-wide unique identifier that is assigned to the queue at creation time, or some combination of the above, for example.

A dummy node having a next pointer is always present (although it may be temporarily dequeued by a thread). The next pointer of the dummy node points to a next node in the queue if the dummy is not currently the tail node and points to the queue-specific number if the queue is empty. In this way, the queue always contains at least one node.

In accordance with another aspect of the invention, a method is provided for one thread in a system running plural threads to dequeue a node from a selected one of the FIFO queues. The method is performed by first determining whether another thread has preempted the one thread and dequeued a node from the head of the queue and, if so, re-starting the method. Otherwise, the next step is determining, in the event the queue appears to be empty, whether another thread has preempted the one thread by enqueueing a new node at the tail of the queue, and if the other thread did not update the tail pointer, updating the tail pointer and re-starting the method. If the queue does not appear to be empty, the next step is determining whether another thread has preempted the one thread and dequeued a node from the head of the queue and, if so, re-starting the method. Otherwise, the head node is dequeued by changing the head pointer to equal the next pointer of the head node. Finally, if the dequeued node is a dummy node, the dummy node must be re-enqueued onto the queue. At this point, the thread may restart the dequeueing method with the new head node.

The step of determining whether another thread has preempted the one thread is preceded by first determining whether the queue appears to be empty. This is accomplished by determining whether the head pointer and the tail pointer point to the same node. If so, it is then determined whether the queue is actually empty by determining whether the next pointer of the head node points to the queue-specific number. If this is the case, the queue is considered empty and the operation is terminated.

The step of determining whether another thread has preempted the one thread and dequeued a node from the head is preceded by making a local copy of the head pointer, the tail pointer and the next pointer of the head node. The step of determining whether another thread has preempted the one thread and dequeued a node from the head consists of determining whether the head pointer has changed since the making of the local copy. The step of determining whether another thread has preempted the one thread and enqueued a new node at the tail consists of determining whether the tail pointer has changed since the making of the local copy. The step of determining whether the queue is empty consists of determining whether the next pointer of the head node is the queue-specific number. The step of updating the tail pointer consists of changing the tail pointer to equal the next pointer of the tail node (i.e., the node currently pointed to by the tail pointer).

In accordance with a further aspect of the invention, a method is provided for constructing a FIFO queue data structure. This method is carried out by first providing memory space for a head pointer, a tail pointer and a dummy node. Initially, the new queue will contain only the dummy node. The next step is to set the head pointer to point to the dummy node, set the tail pointer to pointer to the dummy node and set the next pointer of the dummy node to point to the queue-specific number.

DETAILED DESCRIPTION OF THE PREFERRED EMBODIMENTS

Exemplary Operating Environment

Figure 1:
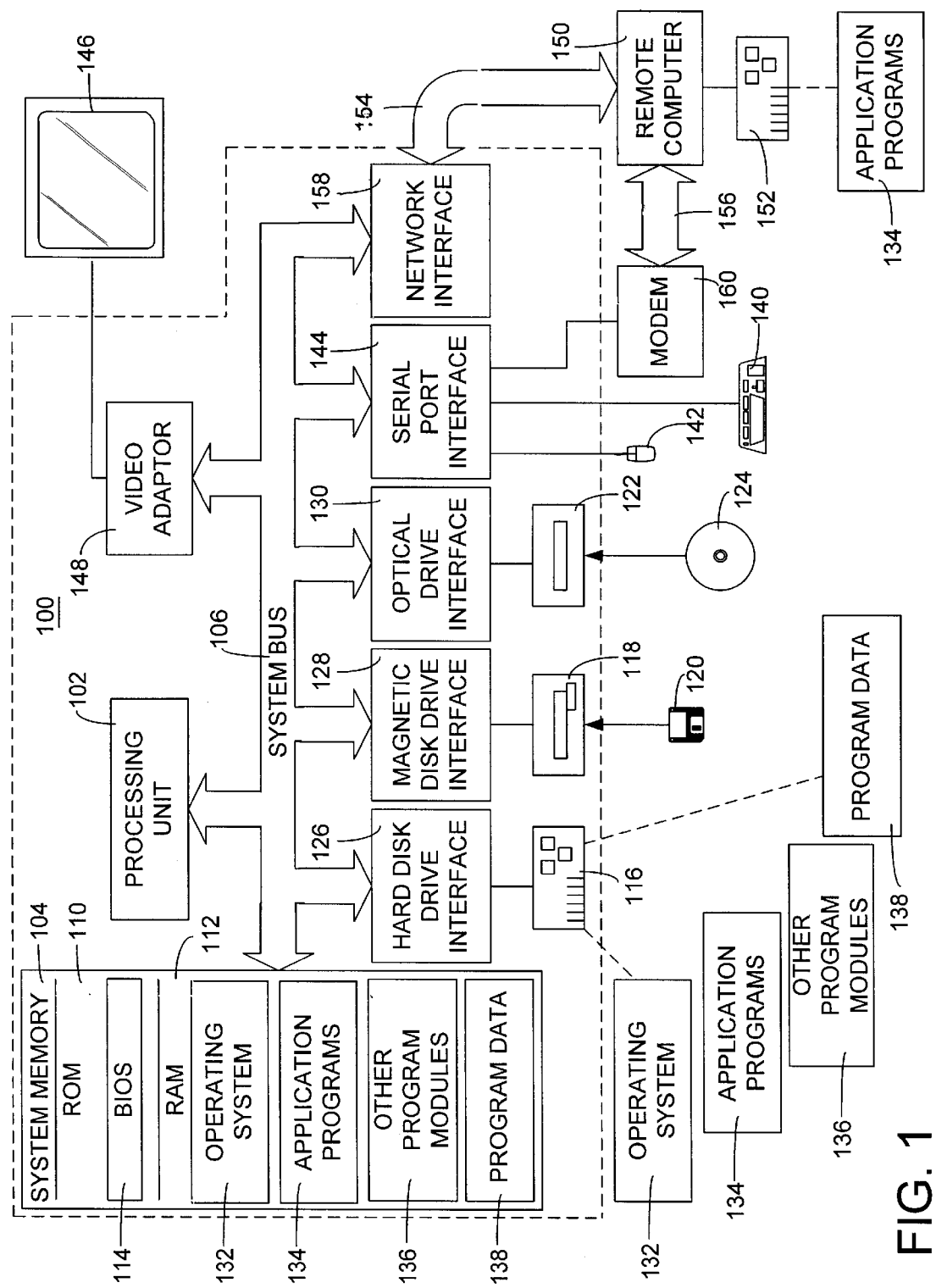
FIG. 1 illustrates an exemplary operating environment of the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include processes, programs, objects, components, data structures, etc. that perform particular tasks or implement particular abstract data types. Moreover, those skilled in the art will appreciate that the invention may be practiced with other computer system configurations, including inside various programmable peripheral interface cards such as 126, 128, 130, 144, 158, 148 in FIG. 1, inside programmable peripherals such as disks, game controllers and accessories, speakers, modems, printers and the like, in hand-held devices, multiprocessor systems, microprocessor-based or programmable consumer electronics, network PCs, minicomputers, mainframe computers, and the like. Thus, for example, the present invention can be an operating system of an optimally minimized configuration, as described below, running inside a network interface card of the network interface 158 of FIG. 1 or in an embedded control system or in a communication-oriented device. The invention may also be practiced in distributed computing environments where tasks are performed by remote processing devices that are linked through a communications network. In a distributed computing environment, program modules may be located both in local and in remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic process that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Queue Structure

Figure 2:
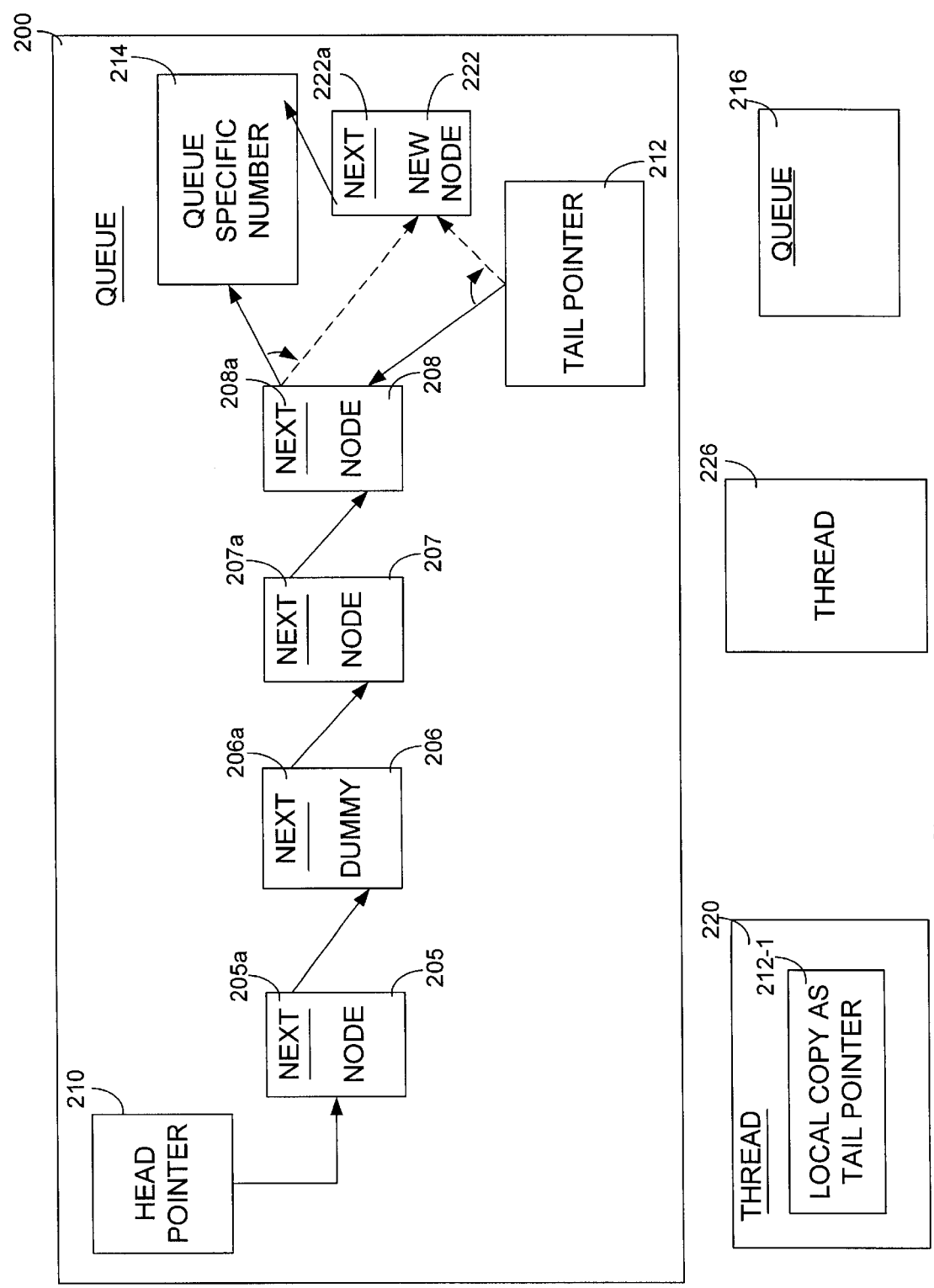
FIG. 2 is a block diagram of apparatus embodying an aspect of the invention and illustrating an enqueue operation.

Referring to FIG. 2, a FIFO queue 200 embodying the prpresent invention consists of a stored list specifying a succession of nodes 205, 206, 207, 208 which are locations in a memory containing data such as the RAM 112 of FIG. 1. The node 206 is a dummy node which is not available to external threads. With the exception of the dummy node 206, all of the nodes have been enqueued by external process or application threads and any of them may be dequeued by a thread. The list is specified as follows: each node 205, 206, 207, 208 has a next pointer 205a, 206a, 207a, 208a, respectively pointing to the next node in the queue; a head pointer 210 points to the node 205 at the head of the queue (the "head node") and a tail pointer 212 points to the node 208 at the tail of the queue (the "tail node"). The nodes 205, 206, 207, 208 and their next pointers 205a, 206a, 207a, 208a, and the head and tail pointers 210, 212 are components of a queue interface (IQueue) object stored in working memory, such as the RAM 112 of FIG. 1. The next pointer of the tail node 212 is a "magic number" or queue-specific number 214 which is unique to the queue 200 relative to any other queue, for example the queue 216. The queue 216 can have the same structure as the queue 200. The queue-specific number may be the address of the head pointer 210 of the queue 200 or the address of the tail pointer 212 or a similar pointer with the low bit set to 1 rendering it an invalid pointer which would render it unique relative to any other pointer. It could also be a system-wide unique identifier dynamically generated at queue creation time. Likewise, a different queue-specific number would be similarly employed in the other queue 216.

Enqueuing Method

Figure 3:
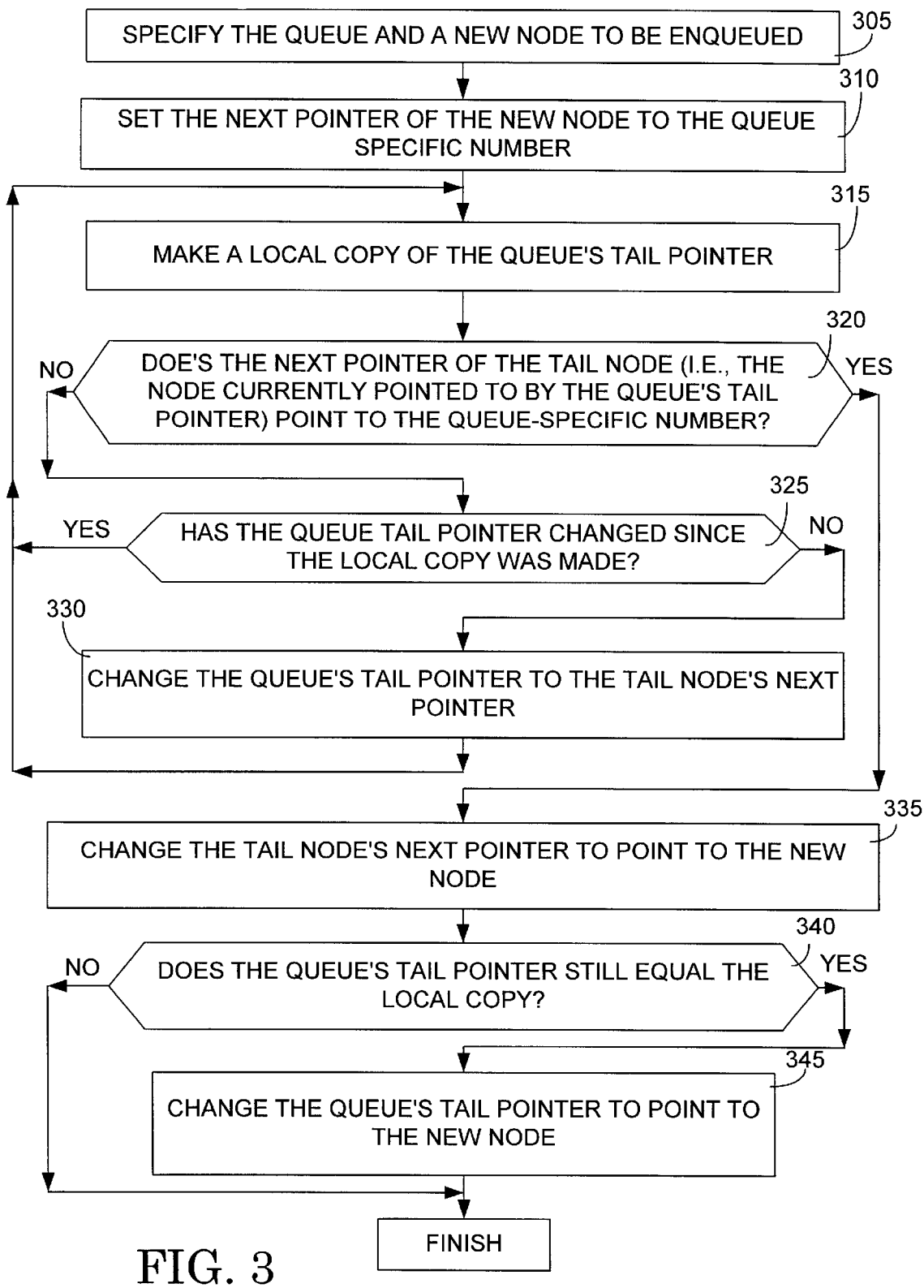
FIG. 3 is a flow diagram of an enqueue operation carried out in the apparatus of FIG. 2.

As will be described below, an IQueue object provides a method for enqueueing a node onto the queue and a method for dequeueing a node from the queue. The node itself is not part of the IQueue object. The method for enqueueing a node will now be described with reference to an example in which a thread 220 enqueues a new node 222 onto the queue 200. The new node 222 has a next pointer 222a. The solid line configuration of FIG. 2 illustrates the state of the queue 200 prior to the new node 222 being enqueued. The dashed lines indicate the changes made in enqueueing the new node 222. Referring now to FIG. 3, the enqueueing method begins by the thread 220 deciding upon the queue 200 and the new node 222 as the one to be enqueued (block 305 of FIG. 3). Then, the thread 220 sets the next pointer 222a of the new node 222 to the queue-specific number 214 (block 310). The thread 220 reads the tail pointer 212 and makes a local copy 212-1 of the tail pointer 212 (block 315). The local copy 212-1 cannot be changed by another thread, while the tail pointer 212 in the queue 200 may be changed by some other thread (e.g., the thread 226) by preempting the thread 220, or by running concurrently on a different processor of a shared-memory based multiprocessor computer system.

A determination is then made as to whether the tail node's next pointer 208a is the queue-specific number 214 (block 320). If the comparison fails (NO branch of block 320), this means that sometime after the local copy 212-1 was made, some other thread (e.g., the thread 226) enqueued onto the tail of the queue 200 another node unknown to the thread 200. In such an event, the next pointer 208a would have been changed by the other thread to point to the "unknown" node it enqueued. (The "unknown" node enqueued by the other thread in this event is not illustrated in FIG. 3 for the sake of simplicity). In this event, the other thread might have failed to update the tail pointer 212 so that the tail pointer 212 needs updating. Therefore the next step is to determine whether the tail pointer 212 has changed since the local copy 224 was made (block 325). If not (NO branch of block 325), the tail pointer 212 is updated by changing the tail pointer 212 to be the same as the next pointer 208a of what used to be the tail node 208 (block 330). Otherwise, if the tail pointer 212 has changed (YES branch of block 325), the updating step (block 330) is skipped and the process returns to the beginning (e.g., to block 315) to make a next attempt by repeating the foregoing steps of blocks 315–330. After one or more such attempts, the determination step of block 320 will ultimately succeed (YES branch of block 320). In this case, what is now the current tail node's next pointer 208a is changed to point to the new node 222 being enqueued by the thread 220 (block 335). This step is indicated in FIG. 2 showing the arrow from the next pointer 208a swinging from its solid line position to the dashed line position. The new node 222 is now in the queue 200. The next step is to update the tail pointer 212 to point to the new node 222. However, another thread may have just enqueued another node (unknown to the thread 220) and updated the tail pointer 212 accordingly, in which case the tail pointer 212 should not be changed. Therefore, a determination is first made to be sure that some other thread has not changed the tail pointer 212 since the local copy was made (block 340). If so (YES branch of block 340), the tail pointer 212 is updated to point to the new node 222 (block 345). This is illustrated in FIG. 2 showing the arrow from the tail pointer 212 swinging from its solid line position to the dashed line position. Otherwise (NO branch of block 340), if the tail pointer 212 has changed the step of block is skipped and the enqueueing method is finished. Since many different threads (e.g., the threads 220, 226) have concurrent access to anyone of the queues 200, 216, each queue is a concurrent queue.

The foregoing enqueue method may be summarized as follows: A thread designates of its own choosing any node to which it has access for enqueueing into the queue. The next pointer of the node to be enqueued is set to the queue-specific number (block 310) and the tail pointer is tested for correctness (block 315, 320). An attempt is made to correct the tail pointer if incorrect (blocks 325, 330) and the test repeated. Otherwise, if the tail pointer is correct, the next pointer of the current tail node is swung to point to the new node (block 335) and the tail pointer is updated accordingly unless another thread has intervened to change the tail pointer (blocks 340, 345).

Dequeueing Method

Figure 4:
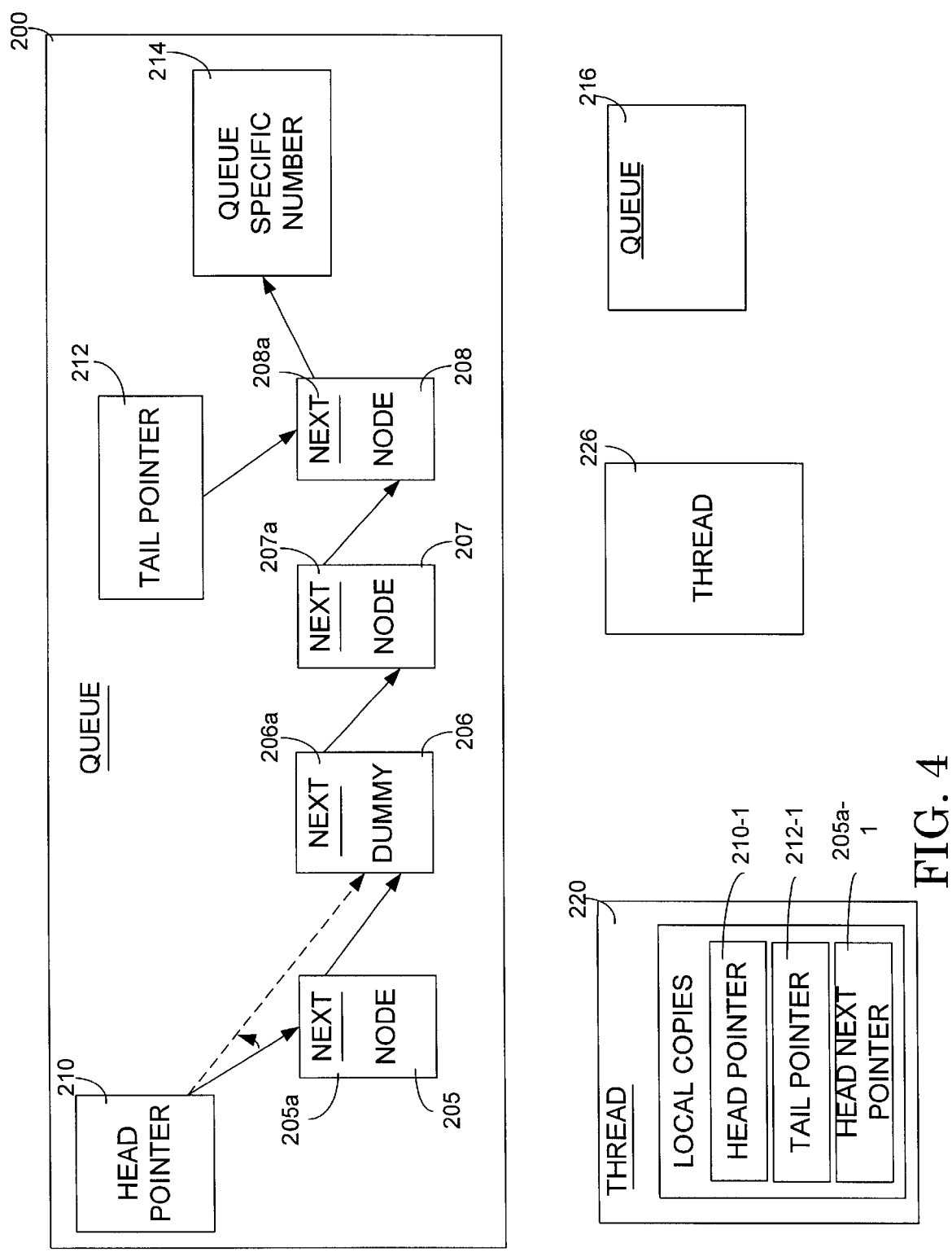
FIG. 4 is a block diagram of apparatus embodying an aspect of the invention and illustrating a dequeue operation.

FIG. 4 illustrates changes to the queue structure of FIG. 2 that are made in dequeueing a node from the queue 200. In general, a successful dequeue operation will remove the head node 205 by swinging the head pointer 210 from the current head node 205 to its successor, the node 206. This is illustrated in FIG. 4 by the arrow from the head pointer 210 swinging from its solid line position to the dashed line position. The dequeueing method of the invention will now be described with reference to FIG. 5.

An important feature of the dequeue method of the invention is that no thread is allowed to dequeue the dummy node 206, in that whenever the dummy node reaches the head of the queue and is dequeued, the method requires the thread holding the dummy node 206 to re-enqueue the dummy node 206 using the enqueue process described above with reference to FIGS. 2 and 3. Moreover, no thread is permitted to dequeue any node from the queue if it is the one node remaining in the queue. This feature enables the queue methods of the invention to permit threads to directly enqueue and dequeue nodes they may choose and actually remove a dequeued node from the queue, rather than merely access the data stored in the node. By always requiring at least one node to be present in the queue, e.g., the dummy node 206, the head and tail pointers 210, 212 always have a node in the queue to point to and the structure is simple and reliable, a significant advantage.

Figure 5:
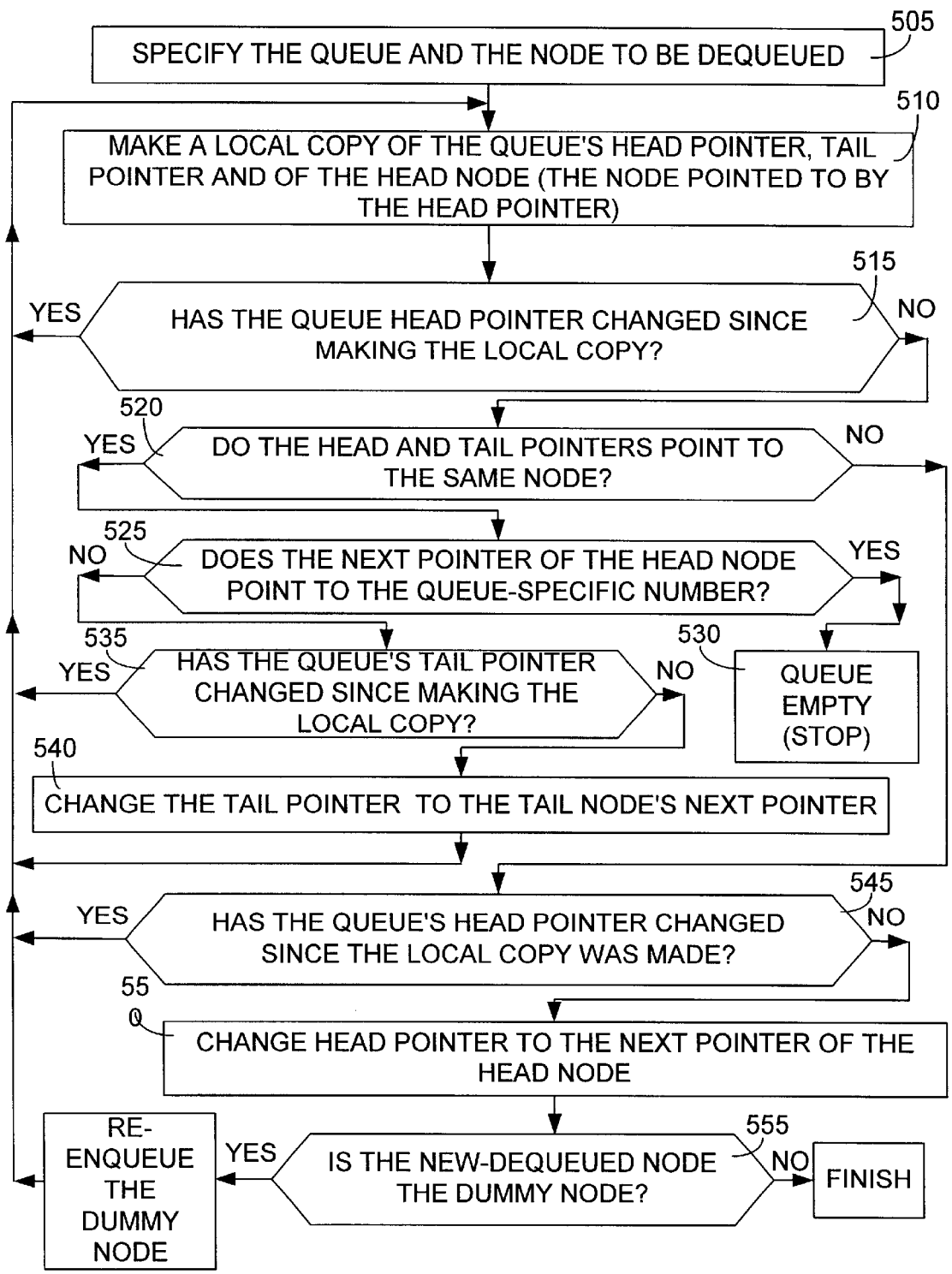
FIG. 5 is a flow diagram of a dequeue operation carried out in the apparatus of FIG. 4.

The dequeue begins with the thread 220 deciding upon the queue 200 as one from which to dequeue a node (block 505 of FIG. 5). Normally, the thread 220 simply wishes to retrieve the first element of the queue, e.g. the next work item in a list of such. In an alternative embodiment of the present invention, the thread 220 may be looking for a particular node it believes to be on the queue 200 and which it therefore desires to dequeue. If this node is not currently the head node, then the thread will have to wait until it becomes so, or it may dequeue and re-enqueue successive nodes of the queue until the desired node becomes the head node 205.

Dequeueing the first node in the queue is accomplished as follows. The thread 220 first makes local copies of the queue's head pointer 210, tail pointer 212 and of the next pointer 205a of the current head node 205 (block 510). These local copies are illustrated in FIG. 4 as the local copies 210-1, 212-1 and 205a-1 in the thread 220. Next, a "stability" check is performed by determining whether the head pointer 210 has changed since the local copy 210-1 was made (block 515). If so (YES branch of block 515), another thread (e.g., the thread 226) has preempted the thread 220, and the process must return to the beginning (block 510). Otherwise (NO branch of block 515), the queue has not changed and the dequeueing method may continue with the next step, which is determining whether or not the head and tail pointers 210, 212 point to the same node (block 520).

The test of block 520 is made because one of two conditions may be present that would affect the dequeue method: (1) there may be only one node in the queue (e.g., the dummy node 206), in which case no dequeue operation is allowed in order to prevent the queue from becoming completely empty, or (2) the queue is not empty but the tail pointer 212 does not point to the current tail node. In condition (1) (only one node in the queue), the one remaining node would typically be the dummy node 206, unless it has been dequeued by another thread, in which the other thread is waiting to return the dummy node to the queue, as will be described below. Condition (2) may arise by another thread, while preempting the thread 220, enqueueing a new node but failing to update the tail pointer 212. With condition (1), the dequeue operation must be terminated to keep at least one node in the queue, while with condition (2) the tail pointer 212 should be updated and the dequeueing operation allowed to continue. In order to distinguish between conditions (1) and (2), a determination is made whether the head node's next pointer 205a is the queue-specific number 214 (block 525). It does (YES branch of block 525), there is only one remaining node in the queue, and the queue process is terminated in order to avoid completely emptying the queue (block 530). Otherwise (NO branch of block 525), there is more than one node on the queue and (local copies of) the head and tail pointers are the same just because the tail pointer 212 is wrong. This indicates that another thread has probably intervened to enqueue a new node, so that there are at least two nodes on the queue. Furthermore, yet another thread may then intervene and set the tail pointer 212 to the true tail node which it just enqueued, in which case the tail pointer 212 might now be correct and should not be changed. Therefore, a determination is first made as to whether the tail pointer 212 has changed since the local copy 212-1 was made (block 535). If not (NO branch of block 535), the tail pointer 212 is set to equal the next pointer of what the local copy 212-1 identified as the tail node (and which is no longer the real tail node due to the intervention by another thread) (block 540). Otherwise (YES branch of block 535), the tail pointer correction step of block 540 is skipped. In either case, the entire process is restarted (at the beginning of the step of block 510) for a next attempt to dequeue. This loop is reiterated until the determination step of block 520 finds that the head and tail pointers 210, 215 point to different nodes (YES branch of block 520). This means that the tail node has not been changed and now it must be determined whether the head node has changed. Thus, the next step is to determine whether the head pointer 210 has changed since the local copy 210-1 was made (block 545). If it has changed (YES branch of block 545), another thread has probably intervened and pulled a node off the queue, and therefore the entire dequeue process must be restarted (back to the beginning of the step of block 510). Otherwise (NO branch of block 545), no other thread has intervened and the dequeue operation may be carried out to completion. Thus, the next step is to change the head pointer 210 to equal the contents of the next pointer 205a of the head node 205, so that the next node 206 becomes the new head node (block 550). This change is illustrated in FIG. 4 with the arrow from the next pointer 205a swinging from its solid line position to the dashed line position. In order to avoid losing the dummy node from the queue, the next step is to check whether the dequeued node is the dummy node (block 555). If it is (YES branch of block 555), then the thread must re-enqueue the dummy node back onto the queue 200 using the enqueue method of FIG. 3 (block 560), and return to the beginning of the dequeue method (to the step of block 510). Otherwise (NO branch of block 555) the dequeue operation has successfully finished and the node 205 has been dequeued from the queue 200.

The foregoing dequeue method may be summarized as follows: A thread specifies of its own choosing any queue from which it desires to remove the first node. It then checks to see whether another thread has changed the head pointer (block 515) and if so the method is re-started. Otherwise, it determines whether the tail pointer is anomalous (block 520). If so, it determines whether the tail pointer needs correction or whether the queue is empty (block 525). If the queue is empty, the method is terminated. Otherwise, an attempt is made to correct the tail pointer (blocks 535, 540)

and the method is re-started. On the other hand, if the tail pointer is not anomalous, a stability check of the head pointer is made and the head is swung to away from the head node to the second node provided the head pointer has not changed (blocks 545, 500), which dequeues the head node. However, if the dequeued node is the dummy, it is re-enqueued and the operation re-started (block 560).

Constructing the IQueue Object

Figure 6:
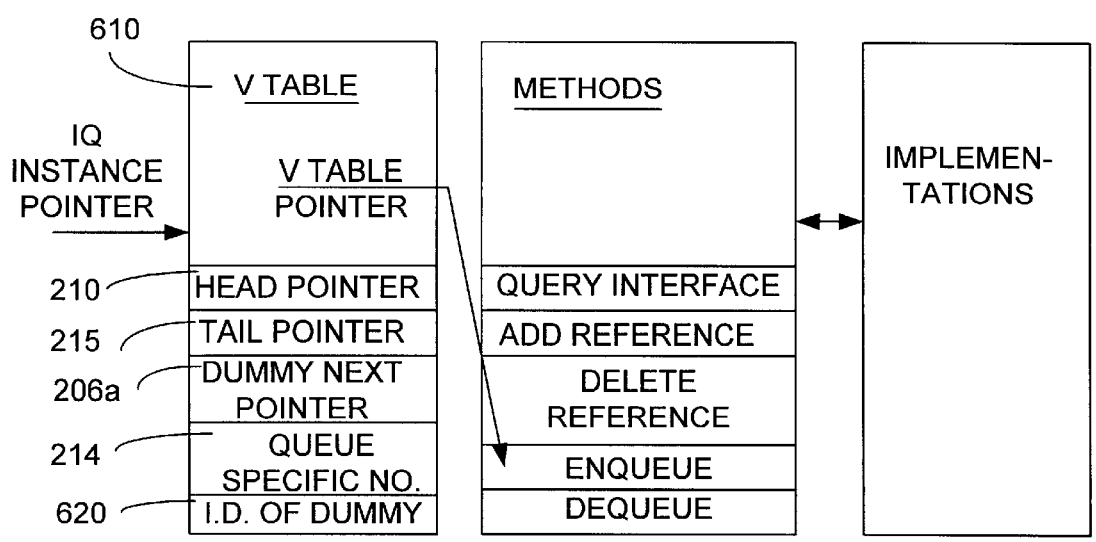
FIG. 6 is a diagram illustrating a queue interface object embodying one aspect of the invention.

The queue 200 and its enqueueing and dequeueing methods may be provided as a loadable object such as a component object model (COM) object having an interface by which its methods are made available to other threads or objects. Such an object is illustrated in FIG. 6 and includes a queue object 610 with an IQueue instance pointer 615 and a V table pointer 620 to a set of methods 625. The queue object 610 includes the head pointer 210, the tail pointer 215, the dummy node 206a which only needs to contain the next pointer field. The set of methods 625 includes the typical COM object methods of QueryInterface 630, AddReference 635 and DeleteReference 640. In addition, the set of methods 625 includes the enqueue method 645 of FIG. 3 and the dequeue method 650 of FIG. 5. Each of these methods has a method pointer to an appropriate implementation containing the code for carrying out the method. Thus, the enqueue method provides a pointer to an implementation containing executable instructions or code corresponding to the flow chart of FIG. 3. The dequeue method provides a pointer to an implementation containing executable instructions or code corresponding to the flow chart of FIG. 5. The query interface method, as in a typical COM object, permits any thread having an IUnknown pointer to the object to ask the object for a particular interface (such as IUnknown or IQueue). Such COM interfaces are discussed in U.S. application Ser. No. 09/282,238 filed Mar. 31, 1999 by Raffman et al. and entitled "A Highly Componentized System Architecture with a Demand-Loading Namespace and Programming Model", the disclosure of which is hereby incorporated by reference.

Figure 7:
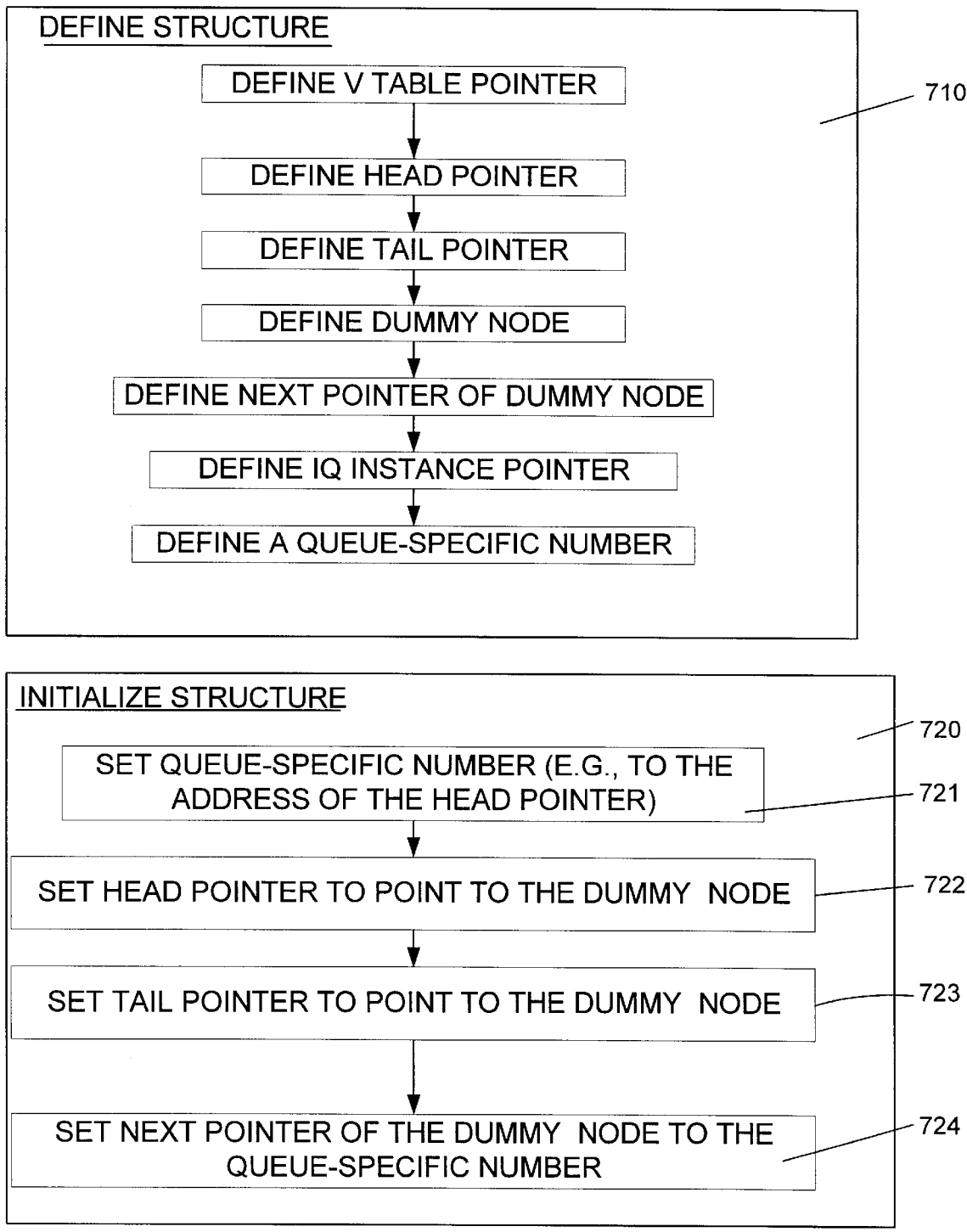
FIG. 7 is a flow diagram illustrating a process of the constructing the queue interface object of FIG. 6.

The IQueue object of FIG. 6 has a constructor for constructing a specific queue, and the constructor operates in the manner illustrated in FIG. 7. The first step carried out by the constructor is to define the queue structure (block 710 of FIG. 7). This includes constructing a V table pointer, a head pointer, a tail pointer, a dummy node, a dummy node next pointer, and an IQueue instance pointer. Note that the queue-specific number is preferably computed inside the Enqueue and Dequeue methods and does not need to occupy memory storage. In an alternate embodiment of the present invention a queue-specific number might also be defined. The next step is to initialize the structure (block 720) as follows: Set the head pointer to point to the dummy node (block 722). Set the tail pointer to point to the dummy node (block 723). And, set the next pointer of the dummy node to the queue-specific number (block 724).

In a preferred implementation, while each next pointer (205a, 206a, etc.) is 32 bits, the head pointer 210 and the tail pointer 212 are each 64 bits, of which 32 bits are address bits and 32 bits are used for a version number.

In carrying out this preferred implementation in the process of FIG. 3, when the tail pointer is changed in the step of block 330 of FIG. 3, its 32 bit address field is changed to the tail node's next pointer, and, in addition, its 32 bit version field is incremented. Thus, in the step of block 325 of FIG. 3, in determining whether the tail pointer has changed, both the 32 bit address field and the 32 bit version field are compared with the stored version of the tail pointer. If either the address or the version field has changed, then the conclusion is that the tail pointer has changed.

In carrying out this preferred implementation in the process of FIG. 5, the step of block 540 of changing the tail pointer involves changing the 32 bit address field and incrementing the 32 bit version field, as described above with reference to the process of FIG. 3. Thus, the step of block 535 of FIG. 5 determines whether the tail pointer has changed by determining whether the address field has changed and whether the version field has changed, as described above with reference to FIG. 3. Similarly in FIG. 5, the step of block 550 of changing the head pointer involves changing the head pointer's 32 bit address field as well as incrementing the head pointer's 32 bit version field. Thus, the step of block 545 of determining whether the head pointer has changed looks at both the 32 bit address field and the 32 bit version field of the head pointer, and concludes a change has occurred if either one of these fields has changed.

While the invention has been described in detail by specific reference to preferred embodiments, it is understood that variations and modifications thereof may be made without departing from the true spirit and scope of the invention.

What is claimed is:

1. A method for a first thread in a system capable of running plural threads to enqueue a new node onto a selected queue, said system capable of supporting plural queues, each queue comprising a succession of enqueued nodes and having a head pointer pointing to a head node of said succession of enqueued nodes and a tail pointer pointing to a tail node of said succession of enqueued nodes, each of said succession of enqueued nodes having a next pointer, the next pointer of each of said succession of enqueued nodes pointing to a next node in sid succession of enqueued nodes from said head node to said tail node, said method comprising:

obtaining a queue-specific number unique to said selected queue relative to said plural queues;

setting the next pointer of said new node to the queue-specific number of said selected queue;

determining whether a second thread has preempted said first thread in said selected queue and, if so, updating said tail pointer of said selected queue if needed;

otherwise, setting said next pointer of said tail node of said selected queue to point to said new node; and setting said tail pointer of said selected queue to point to said new node if it has not been updated by said second thread during the performance of said method.

2. The method of claim 1 wherein the step of determining whether said second thread has preempted said first thread comprises:

making a local copy of the tail pointer of the selected queue;

determining whether the next pointer of said tail node of said selected queue no longer points to said queue-specific number of said selected queue;

if said next pointer no longer points to said queue-specific number, determining whether said tail pointer of said selected queue has not changed since the local copy of said tail pointer was made.

3. The method of claim 2 wherein the step of updating said tail pointer if needed comprises:

if said tail pointer has not changed since said local copy was made, changing said tail pointer to equal the next pointer of said tail node of said selected queue.

4. The method of claim 3 wherein the step of setting said tail pointer to said new node if it has not been updated by said second thread comprises:

determining whether the tail pointer of said selected queue has not changed since the making of said local copy; and if said tail pointer has not changed since the making of said local copy, setting said tail pointer to point to said new node.

5. The method of claim 1 wherein said next pointer of said tail node of said selected queue initially points to said queue-specific number.

6. The method of claim 1 wherein said queue-specific number is one of:

(a) the address of the head pointer of the queue;

(b) the address of the tail pointer of said queue;

(c) a pointer having its low bit set to one; and (d) a system-wide unique identifier assigned at queue creation time.

7. The method of claim 1 further comprising:

maintaining a dummy node in said selected queue having a next pointer, wherein said next pointer of said dummy node can point to a next node in the selected queue if said dummy node is not currently the tail node and can point to said queue-specific number if said selected queue is empty, whereby said selected queue always contains at least one node.

8. The method of claim 7 wherein, prior to any nodes being enqueued in said selected queue by any of said threads, said selected queue is constructed by the method of:

setting said head pointer to point to said dummy node;

setting said tail pointer to pointer to said dummy node;

determining said queue-specific number of said selected queue; and setting said next pointer of said dummy node to point to said queue-specific number.

9. The method of claim 2 wherein the step of determining whether the next pointer of said tail node no longer points to said queue-specific number prevents said first thread from enqueueing said new node on a queue other than said selected queue in the event said tail node has been re-enqueued on another queue.

10. The method of claim 1 wherein each of said succession of enqueued nodes is a memory location which stores said next pointer and data.

11. A method for a first thread in a system running plural threads to dequeue a node from a selected queue, said system having plural queues, each queue comprising a succession of enqueued nodes and having a head pointer pointing to a head node of said succession of enqueued nodes and a tail pointer pointing to a tail node of said succession of enqueued nodes, each of said succession of enqueued nodes having a next pointer, the next pointer of each of said succession of enqueued nodes pointing to a next node in said succession of enqueued nodes from said head node to said tail node, said method comprising:

determining whether a second thread of the plural threads has preempted said first thread by dequeueing the head node;

determining, if said queue appears to be empty, whether said second thread has preempted said first thread by enqueueing a new node at the tail of said queue, and if the second thread did not update said tail pointer, updating said tail pointer;

if said queue is not empty, determining again whether said second thread has preempted said first thread and dequeued the head node;

otherwise, dequeueing the head node by changing said head pointer to equal the next pointer of said head node;

if the dequeued node is a dummy node, re-enqueuing said dummy node onto said queue.

12. The method of claim 11 wherein the step of determining if said queue appears to be empty whether said second thread has preempted said first thread is preceded by the steps of:

obtaining from said selected queue a queue-specific number unique to said selected queue, the next pointer of said tail node being said queue-specific number;

determining whether said selected queue appears to be empty by determining whether the head pointer and the tail pointer point to a same node, and, if so, determining whether the selected queue is actually empty by determining whether the next pointer of the head node points to said queue-specific number.

13. The method of claim 12 wherein the step of determining whether said second thread has preempted said first thread by dequeueing the head node is preceded by the step of making a local copy of said head pointer, said tail pointer and the next pointer of said head node, and wherein:

the step of determining whether sid second thread has preempted sid first thread by dequeueing the head node comprises determining whether said head pointer has changed since the making of said local copy;

the step of determining whether said second thread has preempted said first thread by enqueueing a new node comprises determining whether said tail pointer has changed since the making of said local copy; and the step of determining if said queue appears to be empty comprises determining whether said next pointer of said head node is said queue-specific number.

14. The method of claim 13 wherein the step of updating said tail pointer comprises changing the tail pointer to equal the next pointer of the tail node.

15. The method of claim 12 wherein said queue-specific number comprises one of:

(a) a memory address of said head pointer;

(b) a memory address of said tail pointer;

(c) a pointer having its low bit set to one; and (d) a system-wide unique identifier assigned at queue creation time.

16. The method of claim 11 wherein:

said next pointer of said dummy node points to a next node in the queue if said dummy node is not currently the tail node and points to said queue-specific number if said queue is empty, whereby said queue always contains at least one node.

17. The method of claim 16 wherein said selected queue is constructed by the method of:

initializing said selected queue to contain only said dummy node;

setting said head pointer to point to said dummy node;

setting said tail pointer to point to said dummy node;

determining said queue-specific number; and setting said next pointer of said dummy node to point to said queue-specific number.

18. The method of claim 11 wherein said first thread is given possession of the dequeued node.

19. A method of constructing a queue data structure, comprising:

providing a head pointer, a tail pointer and a dummy node, the dummy node including a next pointer;

initializing said queue to contain only said dummy node;

setting said head pointer to point to said dummy node;

setting said tail pointer to point to said dummy node;

determining a queue-specific number of said queue unique to said queue; and setting said next pointer of said dummy node to point to said queue-specific number.

20. The method of claim 19 wherein said queue-specific number comprises one of:

(a) an address of said tail pointer;

(b) an address of said head pointer;

(c) a pointer having its low bit set to one; and (d) a system-wide unique identifier assigned at queue creation time.

21. An IQueue object data structure, comprising:

a queue object comprising:
a dummy node,
a head pointer pointing to said dummy node,
a tail pointer pointing to said dummy node,
a next pointer of said dummy node being a queue-specific number;

a set of methods executable by any one of plural threads including at least a first thread and a second thread, comprising:
an enqueue method,
a dequeue method.

22. The data structure of claim 21 wherein said enqueue method comprises:

(1) setting a next pointer of a new node to be enqueued to the queue-specific number of said queue, (2) determining whether said second thread has preempted said first thread in said queue and, if so, updating said tail pointer of said queue if needed, (3) otherwise, setting said next pointer of said tail node of said queue to point to said new node, and (4) setting said tail pointer of said queue to point to said new node if it has not been updated by the second thread during the performance of said method.

23. The data structure of claim 21 wherein said dequeue method comprises:

(1) determining whether said second thread has preempted said first thread and dequeued a head node, (2) determining, if said queue appears to be empty, whether said second thread has preempted said first thread by enqueueing a new node at the tail of said queue, and if the second thread did not update said tail pointer, updating said tail pointer, (3) if said queue is not empty, determining whether said second thread has preempted said first thread and dequeued a head node, (4) otherwise, dequeueing the head node by changing said head pointer to equal the next pointer of said head node, (5) if the dequeued node is a dummy mode, re-enqueuing said dummy node onto said queue.

24. A method of constructing and operating a queue in a system running plural threads including at least a first thread and a second thread and supporting plural queues, comprising:

(A) constructing said queue comprising a plurality of nodes by the steps of:

(1) providing a head pointer, a tail pointer and a dummy node, (2) initializing said queue to contain only said dummy node, (3) setting said head pointer to point to said dummy node, (4) setting said tail pointer to pointer to said dummy node, (5) determining a queue-specific number of said queue unique to said queue, and (6) setting said next pointer of said dummy node to point to said queue-specific number;

(B) enqueueing a first node onto said queue by the steps of:

(1) setting the next pointer of said first node to the queue-specific number of said queue, (2) determining whether said second thread has preempted said first thread in said queue and, if so, updating said tail pointer of said selected queue if needed, (3) otherwise, setting said next pointer of said tail node of said queue to point to said first node, and (4) setting said tail pointer of said queue to point to said first node if it has not been updated by said second thread during the performance of said method; and (C) dequeueing a second node from said queue by the steps of:

(1) determining whether said second thread has preempted said one thread and dequeued the second node from the head of said queue, (2) determining, if said queue appears to be empty whether said second thread has preempted said first thread by enqueueing a third node at the tail of said queue, and if the second thread did not update said tail pointer, updating said tail pointer, (3) if said queue is not empty, determining again whether said second thread has preempted said first thread and dequeued said second node from the head of said queue, (4) otherwise, dequeueing the second node by changing said head pointer to equal the next pointer of said second node, (5) if the second node is a dummy node, re-enqueuing said second node onto said queue.

25. The method of claim 24 further comprising:

after performing the step of dequeueing the second node, if the second node is not a desired node, re-enqueueing the second node;

repeating the steps of re-enqueueing and dequeueing until a desired node has been dequeued.

26. A computer-readable medium storing computer-executable instructions for performing the steps of claim 1.

27. A computer-readable medium storing computer-executable instructions for performing the steps of claim 11.

28. Apparatus capable of running plural threads in which a first thread of the plural threads can enqueue a new node onto a selected queue, said apparatus capable of supporting plural queues, each queue comprising a succession of enqueued nodes and having a head pointer pointing to a head node of said succession of enqueued nodes and a tail pointer pointing to a tail node of said succession of enqueued nodes, each of said succession of enqueued nodes having a next pointer, the next pointer of each of said succession of enqueued nodes pointing to a next node in said succession from said head node to said tail node, said apparatus comprising:

a processor;

a memory having executable instructions stored therein; and wherein the processor, in response to the instructions stored in the memory:

obtains a queue-specific number unique to said selected queue relative to said plural queues;

sets the next pointer of said new node to the queue-specific number of said selected queue;

determines whether a second thread of said plural threads has preempted said first thread in said selected queue and, if so, updates said tail pointer of said selected queue if needed;

otherwise, sets said next pointer of said tail node of said selected queue to point to said new node; and sets said tail pointer of said selected queue to point to said new node if it has not been updated by the second thread.

29. The apparatus of claim 28 wherein the processor determines whether said second thread has preempted said first thread in that said processor:

makes a local copy of the tail pointer of the selected queue;

determines whether the next pointer of said tail node of said selected queue no longer points to said queue-specific number of said selected queue;

if said next pointer no longer points to said queue-specific number, determines whether said tail pointer of said selected queue has not changed since the local copy of said tail pointer was made.

30. The apparatus of claim 29 wherein the processor updates said tail pointer if needed in that said processor:

changes said tail pointer to the equal the next pointer of said tail node of said selected queue, if said tail pointer has not changed since said local copy was made.

31. The apparatus of claim 30 wherein the processor sets said tail pointer to said new node if it has not been updated by said second thread in that said processor:

determines whether the tail pointer of said selected queue has not changed since the making of said local copy; and if said tail pointer has not changed since the making of said local copy, sets said tail pointer to point to said new node.

32. The apparatus of claim 28 wherein said next pointer of said tail node of said queue initially points to said queue-specific number.

33. The apparatus of claim 28 wherein said queue-specific number is one of:

(a) the address of the head pointer of the queue;

(b) the address of the tail pointer of said queue;

(c) a pointer having its low bit set to one; and (d) a system-wide unique identifier assigned at queue creation time.

34. The apparatus of claim 28 wherein the processor, in further response to the instructions stored in the memory:

maintains a dummy node in said queue having a next pointer, wherein said next pointer of said dummy node can point to a next node in the queue if said dummy is not currently the tail node and can point to said queue-specific number if said queue is empty, whereby said queue always contains at least one node.

35. The apparatus of claim 28 wherein each of said succession of enqueued nodes is a memory location which stores said next pointer and data.

36. Apparatus capable of running plural threads including at least a first thread and a second thread that can dequeue a node from a selected queue, said apparatus capable of supporting plural queues, each queue comprising a succession of enqueued nodes and having a head pointer pointing to a head node of said succession of enqueued nodes and a tail pointer pointing to a tail node of said succession of enqueued nodes, each of said nodes having a next pointer, the next pointer of each of said succession of enqueued nodes pointing to a next node in said succession from said head node to said tail node, said apparatus further comprising:

a processor;

a memory having computer-executable instructions stored therein; and wherein the processor, in response to the instructions stored in the memory:

determines whether said second thread has preempted said first thread and dequeued the head node and, if so, resets;

determines, if said queue appears to be empty, whether said second thread has preempted said first thread by enqueueing a new node at the tail of said queue, and if the second thread did not update said tail pointer, updates said tail pointer, and resets;

if said selected queue is not empty, determines whether said second thread has preempted said first thread and dequeued the head node and, if so, resets;

otherwise, dequeues the head node by changing said head pointer to equal the next pointer of said head node;

if the dequeued node is a dummy node, re-enqueues said dummy node onto said queue.

37. The apparatus of claim 36 wherein the processor determines if said queue appears to be empty whether said second thread has preempted said first thread is preceded in that said processor:

obtains from said queue a queue-specific number unique to said selected queue relative to said plurality of queues;

determines whether said selected queue appears to be empty by determining whether the head pointer and the tail pointer point to a same node, and, if so, determines whether the selected queue is actually empty by determining whether the next pointer of the head node points to said queue-specific number.

38. The apparatus of claim 37 wherein the processor, before determining whether said second thread has preempted said first thread and dequeued the head node, first makes a local copy of said head pointer, said tail pointer and the next pointer of said head node, and wherein:

the processor determines whether said second thread has preempted said first thread and dequeued the head node in that said processor determines whether said head pointer has changed since the making of said local copy;

the processor determines whether said second thread has preempted said first thread and enqueued a new node in that said processor determines whether said tail pointer has changed since the making of said local copy; and the processor determines whether said queue is empty in that said processor determines whether said next pointer of said head node is said queue-specific number.

39. The apparatus of claim 38 wherein the processor updates said tail pointer in that said processor changes the tail pointer to equal the next pointer of the tail node.

40. The apparatus of claim 37 wherein said queue-specific number comprises one of:

(a) a memory address of said head pointer;

(b) a memory address of said tail pointer;

(c) a pointer having its low bit set to one; and (d) a system-wide unique identifier assigned at queue creation time.

41. The apparatus of claim 36 wherein:

said next pointer of said dummy node points to a next node in the queue if said dummy is not currently the tail node and points to said queue-specific number if said queue is empty, whereby said queue always contains at least one node.

* * * * *

UNITED STATES PATENT AND TRADEMARK OFFICE
CERTIFICATE OF CORRECTION

PATENT NO. : 6,668,291 B1
DATED : December 23, 2003
INVENTOR(S) : Forin et al.

It is certified that error appears in the above-identified patent and that said Letters Patent is hereby corrected as shown below:

Title page,
Item [56], References Cited, U.S. PATENT DOCUMENTS, insert the following:

-- 09/282,238    Forin et al.    03/31/1999
       09/283,227    Forin et al.    03/31/1999
       09/283,818    Forin et al.    03/31/1999
       09/282,229    Forin et al.    03/31/1999
       09/282,656    Forin et al.    03/31/1999 --.

Column 12,
Line 32, "sid" should read -- said --.

Column 14,
Lines 21 and 22, "sid" should read -- said --.

Signed and Sealed this

Seventeenth Day of August, 2004

JON W. DUDAS
*Acting Director of the United States Patent and Trademark Office*